May 19, 1931. F. A. BYLES 1,806,330
ELECTRICAL REGULATING SYSTEM
Filed Feb. 26, 1930
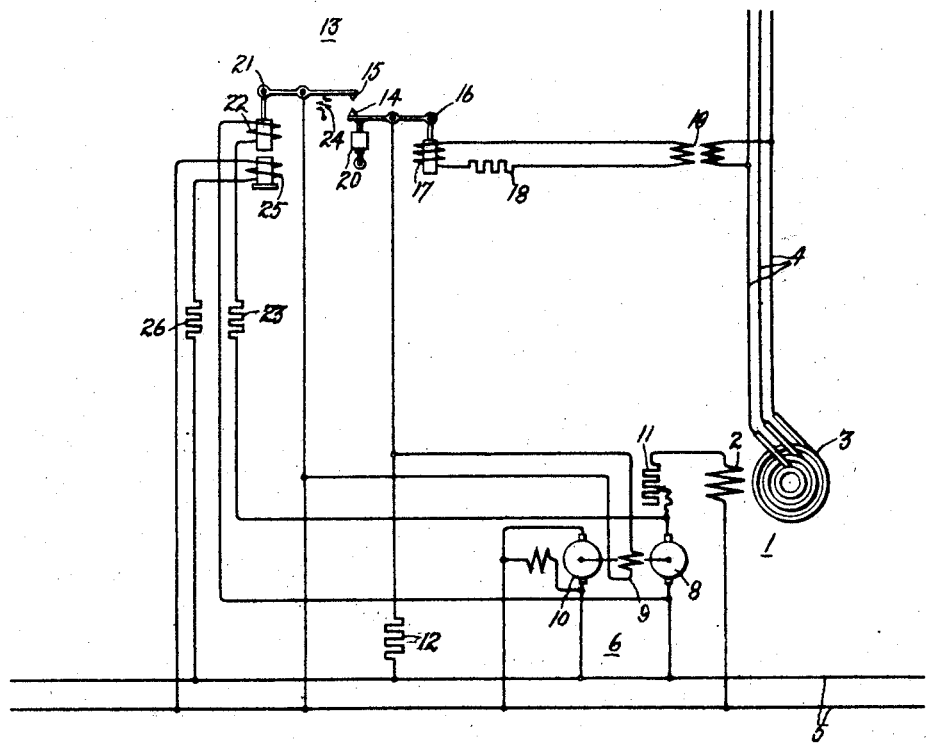
Inventor:
Frank A. Byles,
by Charles E. Tullar
His Attorney.

Patented May 19, 1931

1,806,330

UNITED STATES PATENT OFFICE

FRANK A. BYLES, OF SCOTIA, NEW YORK, ASSIGNOR TO GENERAL ELECTRIC COMPANY, A CORPORATION OF NEW YORK

ELECTRICAL REGULATING SYSTEM

Application filed February 26, 1930. Serial No. 431,594.

My invention relates to electrical regulators and regulating systems and particularly to vibratory contact type voltage regulators.

It often happens that in places where large dynamo electric machines are installed there is available a suitable source of direct current for excitation purposes, thus rendering the use of individual exciters for these machines unnecessary. Such a situation is quite common in large generating stations where the demand for a considerable supply of direct current for the operation of station auxiliaries, as well as for excitation purposes, renders it economical to generate this supply with a single machine.

Under these circumstances it is not feasible to vary the voltage of the direct current supply in order to secure regulation of the excitation of the main dynamo electric machines because such variations in voltage may have a detrimental effect upon the operation of other apparatus connected to the direct current supply and also because if there is more than one main machine it is unlikely that each will require the same variation in excitation at the same time. It is also usually impractical to have the regulators operate directly on the field circuits of large machines because of the considerable magnitude of the currents involved. Consequently, in situations as described above, it is not uncommon to insert in the field circuit of a regulated machine a so-called counter electromotive force machine, which may be either a motor or generator, the regulator being connected to operate on the field circuit of this machine.

In accordance with this practice the anti-hunting means of the regulator has heretofore been connected across the field winding of the regulated machine. I have found, however, that, due to the inductance of the field winding, it takes considerably longer for a voltage change to make itself felt at the terminals of the field winding, as a result of the operation of the regulator, than it does for the voltage to change across the terminals of the counter electromotive force machine. Therefore, were it not for the fact that the voltage change across the terminals of the counter electromotive force machine is opposite to the voltage change across the terminals of the field winding of the regulated machine, a more rapid action of the vibratory anti-hunting means of the ordinary regulator and consequently an improved operation thereof could be achieved by connecting the anti-hunting coil across the terminals of the former. I propose to secure the improved result through the use of a differentially wound operating means for the anti-hunting elements.

It is an object of my invention to provide a new and improved electrical regulator and regulating system.

It is another object of my invention to provide means for increasing the speed of operation of the anti-hunting element of a Tirrill type regulator when associated with a counter electromotive force machine.

My invention will be better understood from the following description taken in connection with the accompanying drawing and its scope will be pointed out in the appended claims.

Referring now to the single figure of the accompanying drawing which is a digrammatic illustration of a preferred embodiment of my invention and in which 1 represents a dynamo electric machine whose voltage is regulated by a vibratory contact regulator 13 which operates on the field circuit of a counter electromotive force generator connected in the field circuit of the regulated machine. Machine 1 may be practically any type of dynamo electric machine, but for the purposes of this description it will be assumed to be a synchronous generator or alternator having an armature 3 which is connected to a load circuit 4 and a field winding 2 which is energized from a direct current supply bus 5. For controlling the current through field winding 2 for regulating purposes there is a direct current motor generator set 6, the generator thereof having its armature 8 connected in the circuit with the field winding 2 of the regulated machine. A suitable adjustable resistance 11 is also connected in this circuit to provide for manual control of the field excitation. Field winding 9 of generator 8 is separately excited from the direct current supply bus 5. In this circuit is connected a suitable current limiting resistance 12. Motor 10 of the motor generator set 6 is shown as a shunt motor whose terminals are connected across the direct current supply bus 5.

Regulator 13 includes the essential elements of the well known regulator of the Tirrill type. Control contacts 14 and 15 thereof are connected so as to short circuit field winding 9 when they are in engagement. The operating means for contact 14 comprises the usual pivoted lever and core arrangement 16 and a main control coil 17 which is connected in series with a suitable current limiting resistance 18 across a supply circuit 4 through a potential transformer 19. It will thus be seen that in accordance with the usual mode of operation of these elements contact 14 will vary its positions in response to variations in the voltage of circuit 4. Regulator 13 is therefore shown as a voltage regulator. However, as the description of my invention proceeds it will become obvious to those skilled in the art that any other well known connections of coil 17 to circuit 4 so as to make contact 14 responsive to variations in current, power, power factor, or any other electrical condition of circuit 4 may equally well be employed without departing from my invention in its broader aspects. The usual dashpot 20 is connected to the lever system 16 in order to dampen the movement of contact 14.

The anti-hunting elements of regulator 13 comprise contact 15, the usual system of operating levers 21, the anti-hunting coil 22, which is connected in series with a resistance 23 across the terminals of the counter electromotive force generator's armature 8, and the restraining spring 24, which for the sake of simplicity is shown as a single spring although in actual practice it usually embodies the well known arrangement of four separate springs which are arranged to be successively stressed at various positions of the system of operating levers. Associated with anti-hunting coil 22 I provide an additional constantly energized coil 25 which I have shown connected across the direct current supply bus 5. In this circuit is connected a suitable current limiting resistance 26.

The operation of my regulating system is as follows. Assume that machine 1 is being driven by a suitable prime mover at its rated speed, that direct current supply bus 5 is energized from a suitable source, and that the load on circuit 4 is constant. Under these assumed circumstances contact 14 will remain stationary as there is no externally produced tendency for the voltage of circuit 4 to change. The anti-hunting means of regulator 13 will at this time be causing a rapid vibratory engagement and disengagement of contacts 14 and 15, through the motion of contact 15, in order to hold constant excitation on machine 1. This action is as follows. Assume that contacts 14 and 15 are in engagement. In this condition field winding 9 of the counter electromotive force generator is short circuited thereby producing a minimum excitation and hence a minimum generated voltage across the terminals of this machine with the result that a maximum voltage will be impressed across the terminals of field winding 2. The tendency therefore is to increase the terminal voltage of machine 1. However, due to the comparatively large inductance of field winding 2 the voltage change across the terminals of armature 8 takes place faster than the current through field winding 2 changes. It will be seen that as the engagement of contacts 14 and 15 results in a decrease in the terminal voltage of the counter electromotive force generator there results a decrease in the energization of the anti-hunting coil 22 which would therefore ordinarily prevent the proper operation of the anti-hunting element, as under these circumstances the proper tendency should be for the contacts 14 and 15 to disengage.

In order to secure the proper operation of the anti-hunting elements I energize coil 25 in such a way that its magneto motive force opposes that of coil 22 and also so that its magneto motive force or number of ampere turns is greater than the maximum magneto motive force of number of ampere turns of coil 22. It will thus be seen that as the energization of coil 22 decreases the net excitation or magneto motive force or ampere turns of coils 22 and 25 taken together increases with the result that contact 15 becomes disengaged from contact 14. The short circuit of field winding 9 is then removed with the result that the voltage of the counter electromotive force generator increases thereby to increase the excitation of coil 22. However, this increase in the excitation of coil 22 makes its energization more nearly equal to that of coil 25 thereby reducing the net excitation of the two coils 22 and 25 with the result that contacts 14 and 15 again become engaged. This action is of course very rapid and produces such minute changes in the current through field winding 2 that no appreciable variation in voltage on line 4 takes place.

If now a load change takes place on circuit 4 the voltage of circuit 4 at the point where the transformer 19 is connected to it will also change. Such a change will cause the excitation of main control coil 17 to vary so as to move contact 14. If the movement is upward as a result of a decrease in voltage on line 4, contacts 14 and 15 will be in engagement a greater portion of the time thereby decreasing the average current flow to the field winding of the counter electromotive force generator with the result that the excitation and consequently the voltage of machine 1 increases. As soon as the voltage of circuit 4 returns to normal contact 14 will cease to move and the anti-hunting elements will continue their vibratory movement in order to hold a new average value of excitation because as contact 14 is in a higher position it will require a greater force to separate the contacts due to the fact that spring 24 is under greater tension.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In an electrical regulating system, a vibratory contact regulator, said regulator including a multi-coil anti-hunting magnet, means under the control of said magnet for varying an electrical condition to be regulated inversely as the net magneto motive force of said magnet varies, one of said coils being connected across a voltage which is controlled by said regulator and which varies inversely with regulated changes in said regulated quantity, another of said coils being connected across a voltage which is controlled by said regulator and which varies inversely with regulated changes in said regulated quantity, another of said coils being connected to a substantially constant voltage source of energy so that its magneto motive force is opposite to and greater than that of said first mentioned coil.

2. The combination with a vibratory contact regulator including an anti-hunting coil, of means associated with said coil for producing a constant magneto motive force which is opposite to and always greater than the magneto motive force of said anti-hunting coil.

3. In combination, a regulated dynamo electric machine, a field winding therefor, a source of substantially constant voltage direct current connected to said winding, a counter electromotive force dynamo electric machine in the field winding circuit of said first mentioned machine, a vibratory contact regulator including an anti-hunting coil connected to regulate an electrical condition of said first mentioned machine through control of the excitation of said counter electromotive force machine, means connecting said anti-hunting coil across the terminals of said counter electro-motive force machine, a coil associated with said anti-hunting coil, and means energizing said last mentioned coil in such a manner that its magneto motive force opposes that of said anti-hunting coil.

4. In a regulating system, in combination, a dynamo electric machine having an armature winding and a field winding, a power circuit connected to said armature winding, a source of substantially constant voltage direct current connected to said field winding, a counter electromotive force dynamo electric machine in series with said field winding, an electrical regulator, having an anti-hunting coil, associated with said power circuit and said dynamo electric machine, said anti-hunting coil being connected across the terminals of said counter electromotive force machine, a coil associated with said anti-hunting coil and means for causing said last mentioned coil to produce a magneto motive force which is opposite to and greater than the magneto motive force produced by said anti-hunting coil.

5. In a regulating system, in combination, a polyphase power circuit, a polyphase synchronous machine having its armature winding connected thereto, a substantially constant voltage source of direct current connected to the field winding of said machine, a direct current motor generator set, the motor thereof being connected to said direct current source, the generator thereof being connected in series with the field winding of said synchronous machine, a vibratory contact voltage regulator including a main control coil connected across said polyphase circuit, a pair of vibratory contacts arranged to intermittently short circuit the field winding of said generator, an anti-hunting coil connected across the terminals of said generator, a coil associated with said anti-hunting coil, and means for energizing said coil so that its magneto motive force is opposite and greater than the maximum magneto motive force of said anti-hunting coil.

In witness whereof, I have hereunto set my hand this 25th day of February, 1930.

FRANK A. BYLES.